Aug. 7, 1934.     G. L. USSELMAN     1,969,339
QUARTZ CRYSTAL MOUNTING
Filed March 24, 1932
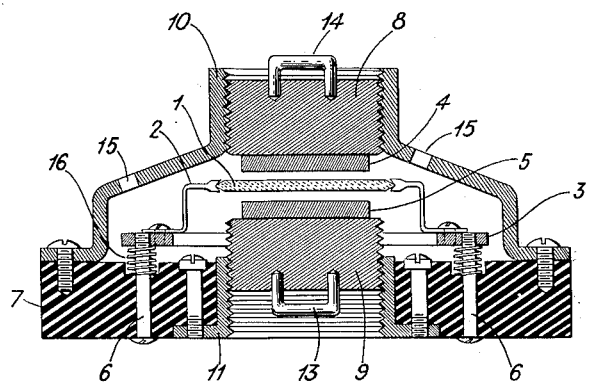
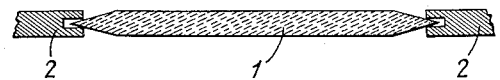
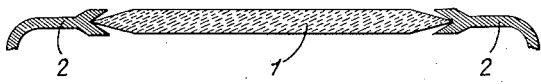
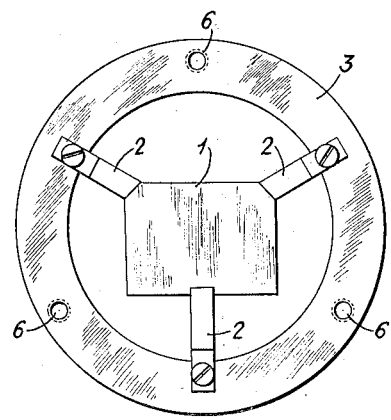
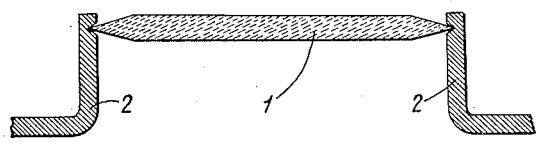
INVENTOR
GEORGE L. USSELMAN
BY
ATTORNEY Patented Aug. 7, 1934

1,969,339

UNITED STATES PATENT OFFICE 1,969,339

QUARTZ CRYSTAL MOUNTING

George Lindley Usselman, Port Jefferson, N. Y., assignor to Radio Corporation of America, a corporation of Delaware Application March 24, 1932, Serial No. 600,956

7 Claims. (Cl. 171—327)

This invention relates to piezo-electric crystal apparatus and has particular reference to a method of and apparatus for supporting the piezo-electric crystal.

Heretofore, it has been the practice in the art to mount the crystal directly upon the electrode so that the lower face of the crystal is in direct contact with the upper face of the bottom electrode. This manner of supporting the crystal element, it has been found, not only dampens the vibrations of the element, but also subjects the crystal to wear and tear. Since the frequency of the crystal is determined by its thickness such wear and tear permanently changes the characteristics of the vibrating element. Another difficulty experienced in this manner of mounting the crystal is that the apparatus does not lend itself readily to easy dissipation of heat, produced by the operation of the vibrating element.

One of the objects of the present invention is to overcome the aforementioned difficulties. This is effected by freely supporting the crystal between the electrodes such that there are air gaps adjacent both faces of the crystal element. The vibrating element is adapted to be supported by spring members which do not interfere with the normal operation of the crystal and, at the same time, do not allow appreciable body movement of the crystal.

An advantage of the present invention is that a more constant frequency is obtained since the crystal has no electrode to beat against to dampen its vibration.

Another advantage is that the crystal faces are not subjected to wear. Consequently, the frequency characteristic of the crystal will permanently remain constant.

A further advantage is that the invention lends itself easily to temperature control since the air gaps on both sides of the crystal allow free circulation of air and aid in cooling the crystal.

A still further advantage is that the present type of mounting prevents the crystal from changing its position and slipping around in the holder, thus aiding in a constant frequency.

A feature of the present invention is the low, heat expansion coefficient insulation used for mounting the electrodes which improves the constancy of frequency of the apparatus.

Other objects, features and advantages will appear in the subsequent detailed disclosure.

Referring to the drawing, Figure 1 illustrates, in cross section, a piezo-electric crystal holder embodying the principles of the present invention. Figures 2, 2a and 2b are fragmentary section views showing different ways in which the crystal may be supported by the springs.

Figure 3 is a plan view of the ring 3 showing the arrangement of the spring supports for crystal 1.

Referring to Figure 1, in more detail, there is shown a piezo-electric crystal 1 supported between electrodes 4, 5 by three metallic springs 2, 2, in turn, mounted upon circular ring 3. The edges of crystal 1 are V shaped and fit into grooves in springs 2, 2. If desired, these edges of the crystal may assume any suitable form.

Springs 2, 2 are spaced apart approximately 120 degrees and are mounted upon metallic ring 3 by means of screws 6, 6, 6 which firmly hold the springs and circular ring to the insulating material 7. These springs are arranged to have suitable openings at their ends facing the crystal, as shown in the drawing, into which the vibrating crystal element is adapted to fit.

The insulation 7 may be any suitable material having a low heat expansion coefficient characteristic. Pyrex glass or Micalex is preferred.

Around each of the three bolts 6, 6, 6 and between ring 3 and insulator 7 is a coil spring 16. This coil spring makes ring 3 adjustable so that crystal 1 may be set parallel with electrodes 4 and 5.

Electrodes 4 and 5 are connected in any suitable manner, such as by soldering, to brass blocks 8 and 9, respectively, which, in turn, are adapted to be screwed into the respective metallic elements 10 and 11. These brass blocks are adjustable and have handles 13 and 14, respectively, for enabling adjustment of the air gaps between the crystal and the electrodes. If desired, the handles may be removable and, in such case, they are inserted only when it is desired to move the electrodes with respect to the crystal. Blocks 8 and 9 are, of course, insulated from circular ring 3. Electrical connections to the electrodes may be made by means of terminals (not shown) connected to metallic elements 10 and 11.

Metallic element 10 is a hollow cylindrical shaped member through which several air holes 15 are drilled to permit air circulation around the faces of the crystal.

The mounting is designed to be open for free air circulation and to minimize changes in the air gap due to heat expansion of the component parts.

Although one particular arrangement of apparatus has been shown for the purpose of describing the present invention it is to be distinctly understood that this invention is not limited thereto since various modifications of the different elements may be made without departing from the spirit and scope of the invention.

I claim:

1. In combination, in a piezo-electric crystal holder, two electrodes, a crystal between said electrodes, and a metallic ring with projections for positioning the crystal relative to said two electrodes, an insulating base, and flexible means for securing said ring to said base.

2. Piezo-electric apparatus having, in combination, a plurality of electrodes, and a crystal element between said electrodes, said crystal being supported free and clear of said electrodes by members at its outer edges, said members being secured to a metallic ring flexibly supported by an insulating base.

3. Piezo-electric crystal apparatus having, in combination, a crystal element having edges which are thinner than the body of said element, spring members having grooves into which said edges are adapted to fit, a ring for supporting said spring members, and an insulation base upon which said ring is adapted to be mounted.

4. A piezo-electric crystal housing, having in combination a piezo-electric crystal, an insulating base, a bushing for securing an electrode to said base, retaining means for a supporting ring, said ring having means for securing and supporting said crystal, a housing secured to said base for retaining a second electrode spaced apart from and located above said crystal.

5. A piezo-electric crystal housing, having in combination a piezo-electric crystal, an insulating base, a metallic bushing for securing an adjustable electrode to said base, retaining means for a metallic supporting ring, said ring having means for securing and supporting said crystal, a metallic housing secured to said base for retaining a second adjustable electrode spaced apart from and located above said crystal.

6. A piezo-electric crystal housing, having in combination a piezo-electric crystal, an insulating base, a bushing for securing an electrode to said base, retaining means for a supporting ring, said ring having means for securing and supporting said crystal, a housing secured to said base for retaining a second electrode spaced apart from and located above said crystal, and a plurality of apertures in said housing for the circulation of air around said crystal.

7. A piezo-electric crystal housing having in combination an insulating base, an electrode adjustably secured to said base, a hollow cylindrical shaped metallic housing member secured to said base, an electrode adjustably secured to said housing, a crystal having a knife-edge periphery interposed between said electrodes, and a plurality of crystal supporting members secured to said base, said crystal supporting members having grooves therein to secure said crystal at its periphery.

GEORGE LINDLEY USSELMAN.